(No Model.)  2 Sheets—Sheet 1.
A. HAENTZE.
COUPLING.
No. 454,866.  Patented June 30, 1891.
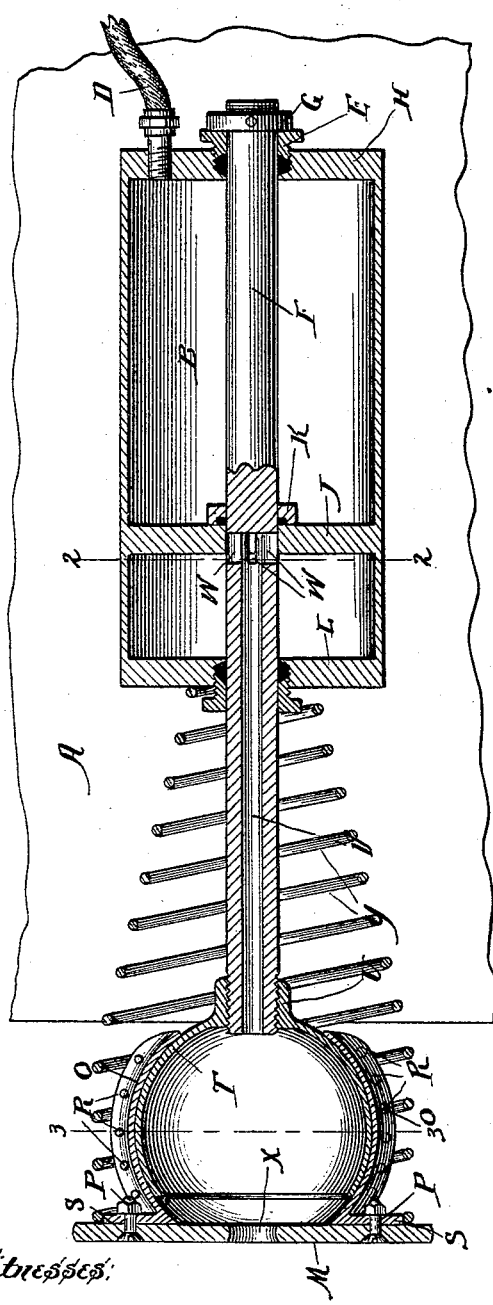
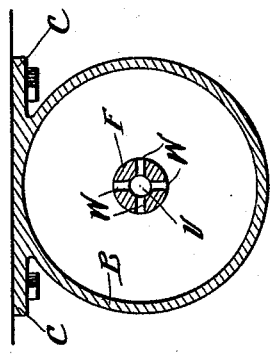
Witnesses:
Celeste P. Chapman.
Jean Elliott.
Inventor:
Albert Haentze
Francis W. Parker
Attorney.

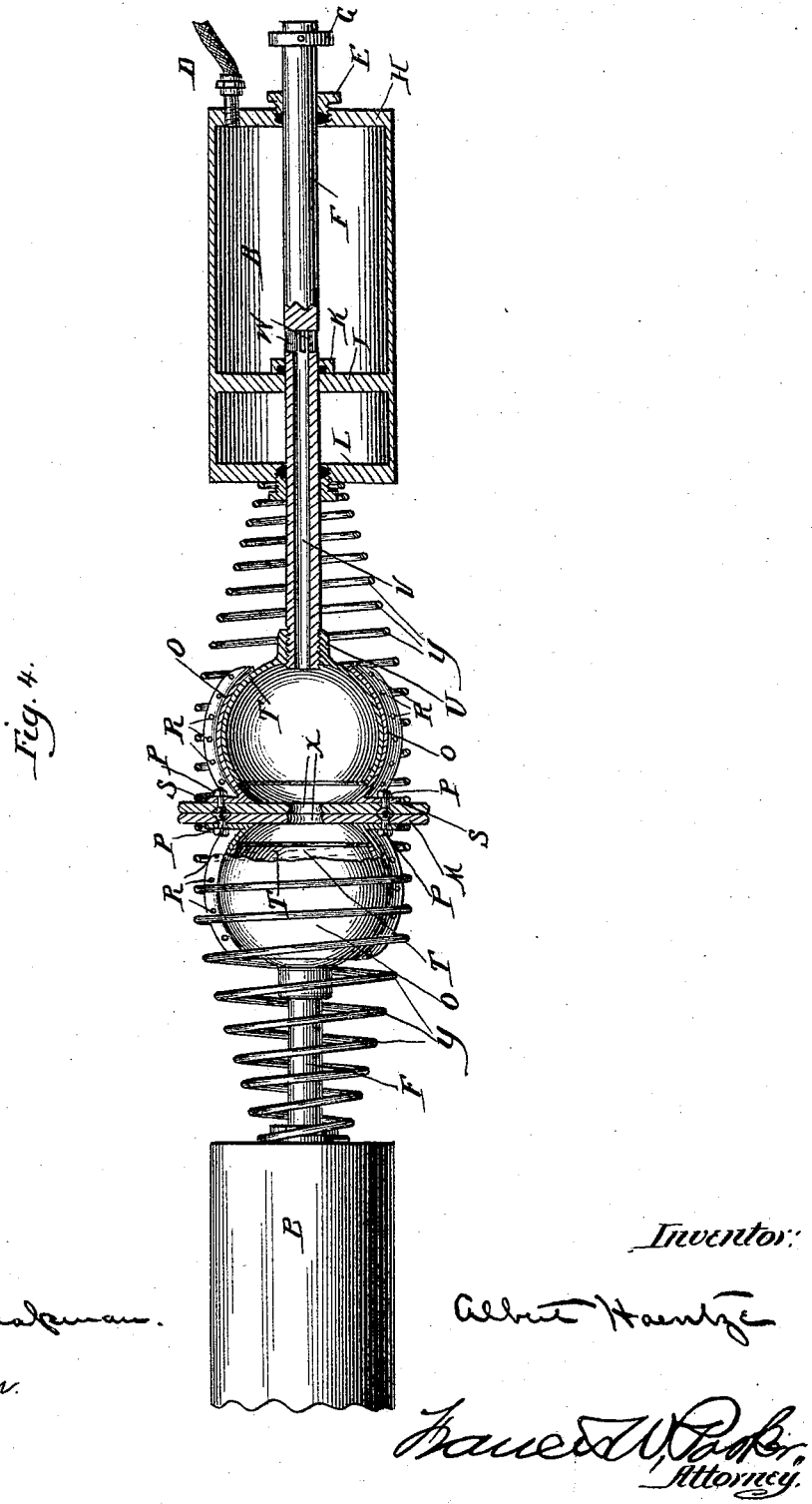

UNITED STATES PATENT OFFICE.

ALBERT HAENTZE, OF AVONDALE, ILLINOIS.

COUPLING.

SPECIFICATION forming part of Letters Patent No. 454,866, dated June 30, 1891.

Application filed March 26, 1891. Serial No. 386,463. (No model.)

*To all whom it may concern:*

Be it known that I, ALBERT HAENTZE, a citizen of the United States, residing at Avondale, in the county of Cook and State of Illinois, have invented a certain new and useful Improvement in Couplings, of which the following is a full, clear, and exact specification.

My invention relates to coupling devices for connecting the fluid systems of railroad-cars in a train; and it consists of the improvements hereinafter described.

My device is illustrated in the accompanying drawings, wherein—

Figure 1 is a longitudinal section on a horizontal plane of the device. Fig. 2 is a cross-section on the line 2 2, and Fig. 3 is a cross-section on the line 3 3. Fig. 4 is a part sectional view showing the opposing coupling-heads in position to enable a connection to be made from one car to another.

Like parts are indicated by the same letter in all the figures.

A may be supposed to be a portion of the body of a car, to the bottom of which is secured the cylindrical tank B, provided with the flanges C C, whereby it is secured to the bottom of the car. D is a fluid-pipe leading to this tank.

E is a stuffing-box in one end of the tank.

F is a piston-rod passing through the tank and provided with the collar G, which engages the outside of the end H of the tank.

J is a diaphragm near one end of the tank, provided with the stuffing-box K.

L is the end of the tank, through which the piston-rod F passes.

M is a metal plate to which the two sides of the globe-shaped piece O are secured by the bolts P. The globe-shaped piece O is composed of two sections, which are flanged and bolted together by the bolts R R, and they are themselves provided with flanges S S, through which the bolts P pass.

T is a globular-shaped piece screw-threaded at U on the end of the piston-rod F and lying within the globe-shaped portion O and fitting close thereto, so as to form a ball-and-socket joint therewith.

V is a longitudinal aperture through the piston-rod F, terminating in the slots W, which pass through the sides of such piston-rod.

X is an aperture in the center of the plate M, and Y is a spiral spring about the rod F, bearing against the end L of the tank and against the flange or shoulder of the plate M.

It is clear that many changes could be made in my invention without departing from the spirit thereof.

The use and operation of my invention are as follows: The suitable number of tanks, being placed upon the car, preferably two upon each end, and suitably connected, are provided each with a hollow piston-rod F and the remaining devices, substantially as illustrated. It will be observed that the globe-shaped part with the plate M projects from the end of the car, and of course the rod F could be provided with any suitable guide. The spring Y forces the globe-shaped portion, and hence the rod F, outwardly away from the car and forces it up so far that the slots W do not open into that portion of the tank between the end H and the diaphragm J, and hence the fluid supplied by the pipe D remains in such portion of the tank under pressure. The opposed car is of course provided with a similar device. The aperture X can be made of any desired diameter up to certain limits. When two cars engage each other and are coupled together, the two opposed plates M come into engagement, and the adjustment is such that both of the springs Y will be compressed, and in each case the piston-rod F will be forced inwardly toward the car to which it is attached and far enough to bring the slot W into the portion of the tank which is included between the diaphragm J and end H. This of course opens connection from the pipe D through such portion of the tank through slot W, aperture V, through the globe-shaped portion, and through the aperture X, through the opposed aperture X, and thus will connect the fluid systems of the two cars.

I claim—

1. In an automatic fluid-coupler for railway-cars, the combination of two globular shells fitting one inside the other and a plate secured to one shell and provided with an aperture which is adapted to register with the corresponding aperture on the opposed coupling-plate when the two plates come together, and the other shell provided with a tube, so that a fluid connection is made from one car to the other through the tube and globular portion when the cars abut.

2. In an automatic fluid-coupler for railway-cars, the combination of two globular shells fitting one inside the other and a plate secured to one shell and provided with an aperture which is adapted to register with the corresponding aperture on the opposed coupling-plate when the two plates come together, and the other shell provided with a tube and a spring normally projecting the globular portion away from the car and adapted to be compressed by the engagement of the coupling of adjacent cars when the two cars are themselves coupled together.

3. In an automatic fluid-coupler for railway-cars, the combination of two globular shells fitting one inside the other and a plate secured to one shell and provided with an aperture which is adapted to register with the corresponding aperture on the opposed coupling-plate when the two plates come together, and the other shell provided with a tube and a spring normally projecting the globular portion away from the car and adapted to be compressed by the engagement of the coupling of adjacent cars when the two cars are themselves coupled together, and a fluid-supply aperture adapted to be connected with the interior of such tube when adjacent cars are coupled together.

4. In an automatic fluid-coupler for railway-cars, the combination of two globular shells fitting one inside the other and provided, respectively, one with an aperture which is adapted to register with the corresponding aperture on the opposed coupling and the other with a tube and a spring normally projecting a globular portion away from the car and adapted to be compressed by the engagement of the coupling of adjacent cars when the two cars are themselves coupled together, and a fluid-supply aperture adapted to be connected with the interior of such tube when adjacent cars are coupled together, and a fluid-supply pipe opening into such chamber, so as to always preserve a fluid-pressure therein.

5. In an automatic fluid-coupler for railway-cars, the combination of two globular shells fitting one inside the other and provided, respectively, one with an aperture which is adapted to register with the corresponding aperture on the opposed coupling and the other with a tube and a spring normally projecting a globular portion away from the car and adapted to be compressed by the engagement of the coupling of adjacent cars when the two cars are themselves coupled together, and a fluid-supply aperture adapted to be connected with the interior of such tube when adjacent cars are coupled together, said tube slotted toward one end to connect the interior of the tube with the surrounding fluid, said tube adapted to reciprocate, so as to bring such slot within the fluid-chamber when the cars are coupled and to leave it out of such fluid-chamber when the cars are disconnected.

ALBERT HAENTZE.

Witnesses:
CELESTE P. CHAPMAN,
HARRIET M. DAY.